United States Patent [19]
Joseph, Jr. et al.

[11] Patent Number: 5,662,955
[45] Date of Patent: Sep. 2, 1997

[54] CALIBRATION METHOD AND APPARATUS FOR COFFEE GRINDER AND BREWER

[75] Inventors: William A Joseph, Jr., Elburn; Donald R. Buttle, Geneva; David G. Motkowski, North Aurora, all of Ill.

[73] Assignee: National Controls Corporation, West Chicago, Ill.

[21] Appl. No.: 386,464

[22] Filed: Feb. 10, 1995

Related U.S. Application Data

[62] Division of Ser. No. 123,607, Sep. 17, 1993, Pat. No. 5,417,145.

[51] Int. Cl.⁶ ........................................... A23F 5/00
[52] U.S. Cl. .......................................... 426/432; 426/433
[58] Field of Search ................................ 426/432, 433

[56] References Cited

U.S. PATENT DOCUMENTS

| | | |
|---|---|---|
| 4,188,863 | 2/1980 | Grossi . |
| 4,328,740 | 5/1982 | McDonough et al. . |
| 4,406,217 | 9/1983 | Oota . |
| 4,418,614 | 12/1983 | Oota et al. . |
| 4,468,406 | 8/1984 | d'Alayer de Costemore d'Arc . |
| 4,478,139 | 10/1984 | Zimmerman . |
| 4,572,060 | 2/1986 | Yung-Kuan . |
| 4,644,571 | 2/1987 | Narita et al. . |
| 4,662,271 | 5/1987 | Woltermann . |
| 4,767,632 | 8/1988 | Meier . |
| 4,789,106 | 12/1988 | Weber . |
| 4,833,978 | 5/1989 | Martone et al. . |
| 4,876,953 | 10/1989 | Imamura et al. . |
| 5,094,153 | 3/1992 | Helbling . |
| 5,186,399 | 2/1993 | Knepler et al. . |
| 5,207,148 | 5/1993 | Anderson et al. . |

*Primary Examiner*—Anthony J. Weier
*Attorney, Agent, or Firm*—Hill, Steadman & Simpson

[57] ABSTRACT

A coffee grinder which has several different automatic grinding capacities is connected to a coffee brewer which has several different automatic brewing capacities by a control that inhibits brewing of all but the corresponding brew capacity following grinding of a quantity of coffee. The grinder is also inhibited from grinding any more coffee until the appropriate brew cycle of the coffee brewer is started. Once the corresponding brewing cycle is selected, the coffee grinder is reset and any grinding capacity may be selected. A calibration mode for the coffee grinder and the coffee brewer is provided wherein the duration of the grinding cycle or brewing cycle, respectively, is set by manually initiating the cycle and then halting of the cycle when the appropriate capacity is reached. The duration of the cycle is then set for subsequent automatic operation.

10 Claims, 12 Drawing Sheets

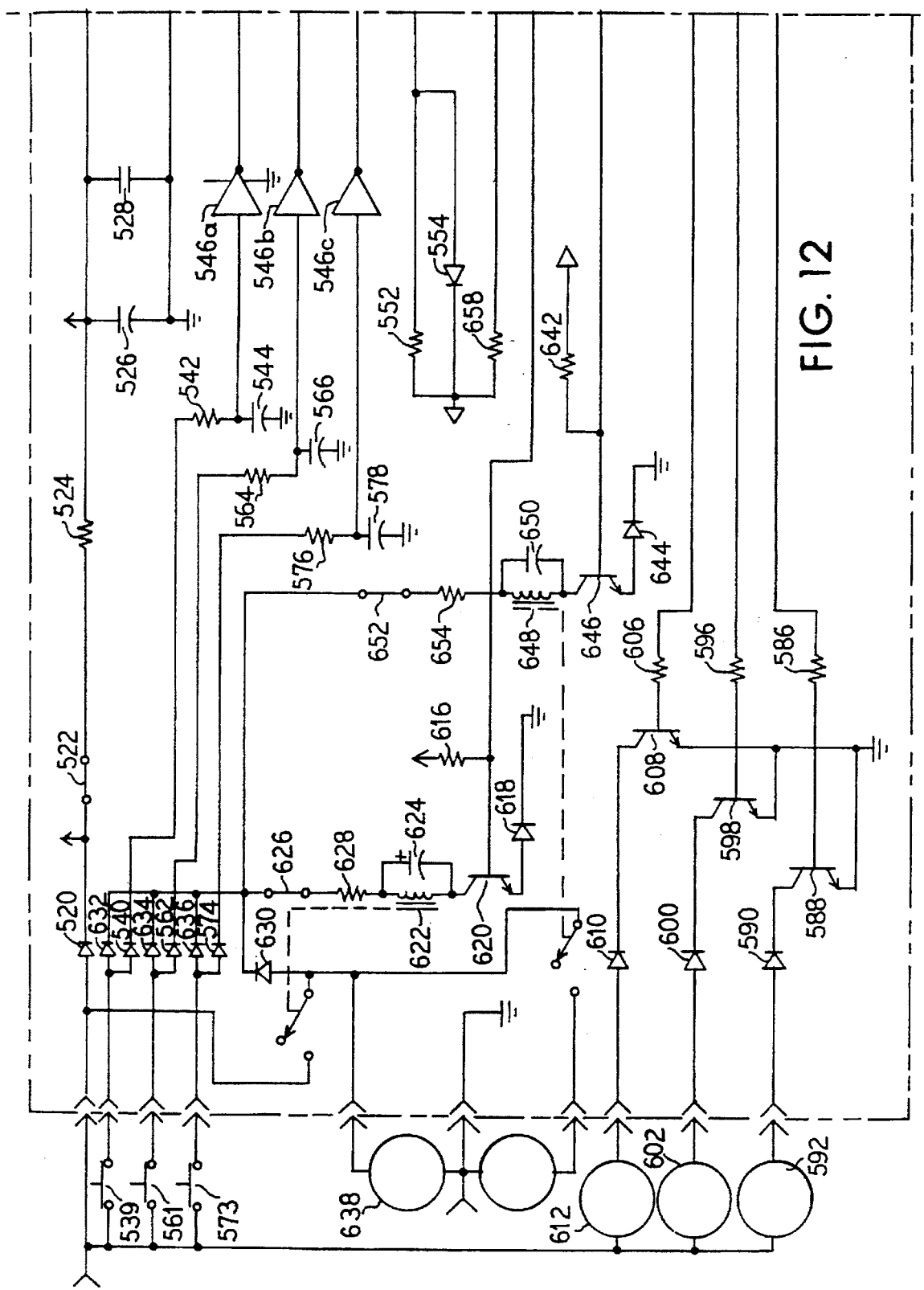

CALIBRATION METHOD AND APPARATUS FOR COFFEE GRINDER AND BREWER

This is a division, of application Ser. No. 08/123,607, filed Sep. 17, 1993 now U.S. Pat. No. 5,417,145.

BACKGROUND OF THE INVENTION

1. Field of the Invention

The present invention relates generally to a control method and apparatus for a coffee grinder and for a coffee brewer, and more particularly, to an interface between a coffee grinder and brewer to selectively provide interlocked operation, and to provide calibration during set up of the respective grinder and brewer.

2. Description of the Related Art

Coffee bean grinders often have automatic controls which provide for grinding of a predetermined measure of ground coffee beans when a grind start switch is operated. Grinders for large volume operation, such as in commercial kitchens, have the ability to grind several different quantities of coffee beans automatically. For example, a commercial coffee grinder may have a switch that causes automatic grinding of a quantity of coffee for 12 cups of brewed coffee, a second switch that causes a quantity of coffee for 24 brewed cups to be ground, and a third switch for 36 cups of brewed coffee. Operation of one of these switches causes the desired quantity of beans to be ground into a filter basket, for example.

Coffee brewers which automatically brew a set quantity of coffee are also known. These coffee brewers are connected to water supply lines, such as municipal water lines, and automatically measure out the appropriate quantity of water for the coffee to be brewed. In commercial coffee brewers, plural brewing capacities are provided. An automatic coffee brewer for use with the above-described coffee grinder has a switch for brewing 12 cups of coffee, a second switch for brewing 24 cups, and a third switch for brewing 36 cups. Of course, other combinations of capacities are possible as well. It is noted that the reference to cups in relation to coffee brewers may not mean an 8 ounce cup, but typically refers to a 6 ounce coffee cup.

In kitchens having such multiple capacity coffee grinders and coffee brewers, the appropriate brew cycle must be selected for the quantity of coffee beans ground during the grind cycle. Due to human error, such as a result of the kitchen staff being distracted or too long a time passing from grinding of the coffee to starting of the brew cycle, a brew cycle that does not match the quantity of ground coffee may be selected. This results in coffee that is either too strong or too weak. Not only must this coffee be disposed of, resulting in costly waste, but another pot of coffee must then be brewed and customers are often left waiting while this second pot, hopefully of the appropriate strength, is brewing.

During set-up of automatic coffee grinders and coffee brewers, operation times for the grind and brew cycles, respectively, must be set. For example, automatic coffee brewers that are connected to a municipal water supply determine the amount of water to use during the brew cycle by timing the opening of a valve. Variations in water pressure from one location to another can cause a different amount of water to be admitted for a certain opening time of the valve. Adjustments of the valve opening time are made on a trial and error basis until the correct quantity of water is used for the brew cycle, each time running a cycle, measuring it, and adjusting the quantity and repeating this until the correct quantity is dispensed.

Coffee grinders also use timers to determine the length of the grind cycle. Variations in coffee bean strength, quality, roast, or whether the coffee is decaffeinated or not, need to be taken into consideration in setting the grind cycle time. Adjustments in the grind time are also done on a trial and error basis in the known automatic coffee grinders.

SUMMARY OF THE INVENTION

An object of the present invention is to permit only a proper brewing cycle to be run for a corresponding quantity of ground coffee that has been ground during an associated grind cycle.

Another object of the invention is to provide easy calibration of a grinder cycle and of a brewer cycle for coffee.

A further object of the invention is to provide a control for a coffee grinder and for a coffee brewer which permits the coffee grinder and the coffee brewer to be connected for interlocked operation and to be selectively disconnected from one another for stand alone operation.

Another object is to provide a safe, low voltage, isolated communication link between associated devices, such as coffee grinders and coffee brewers.

Yet another object of the invention is to provide a simple, digital communication link between equipment.

These and other objects and advantages of the invention are provided by a control for a coffee grinder having a plurality of grinding capacities and a coffee brewer having a plurality of brewing capacities, including grind sensor means in the coffee grinder for sensing occurrence of a grind event and for sensing which of the plurality of grinding capacities has occurred in the grind event, the grind event being grinding of a predetermined quantity of coffee corresponding to a selected one of the plurality of grinding capacities; grind control means in the coffee grinder for generating a grind signal corresponding to the selected one of the plurality of grinding capacities that occurred in the grind event sensed by the grind sensor means; a communication link connected to the grind control means to carry the grind signal; and a brew control means in the coffee brewer and connected to the communication link for inhibiting all of the plurality of brewing capacities but one brewing capacity corresponding to the grind event until the one brewing capacity is selected in the coffee brewer.

The control includes a brew sensor means in the coffee brewer for sensing selection of the one brewing capacity; the brew control means including means for generating a brew signal on the communication link to the grind control means when the one brew capacity is sensed by the brew sensor means; and the grind control means including means for inhibiting all subsequent grinding events by the coffee grinder after occurrence of a grinding event until a brew signal is received by the grind control means.

When the communication link is disconnected, the grinder and the brewer automatically operate as stand alone units. Interconnected operation is once again established when the communication link is reconnected.

Several brewers may be connected in one loop to a grinder with little more effort required than providing additional two wire connections.

The invention provides a control apparatus and method which is not limited to any particular type of equipment, but can be used in other applications as well. For example, ice dispensers and drink dispensers could be connected.

BRIEF DESCRIPTION OF THE DRAWINGS

FIG. 12 is a circuit diagram of a second portion of the brewer control circuit of FIG. 11.

DETAILED DESCRIPTION OF THE PREFERRED EMBODIMENTS

Figure 1:
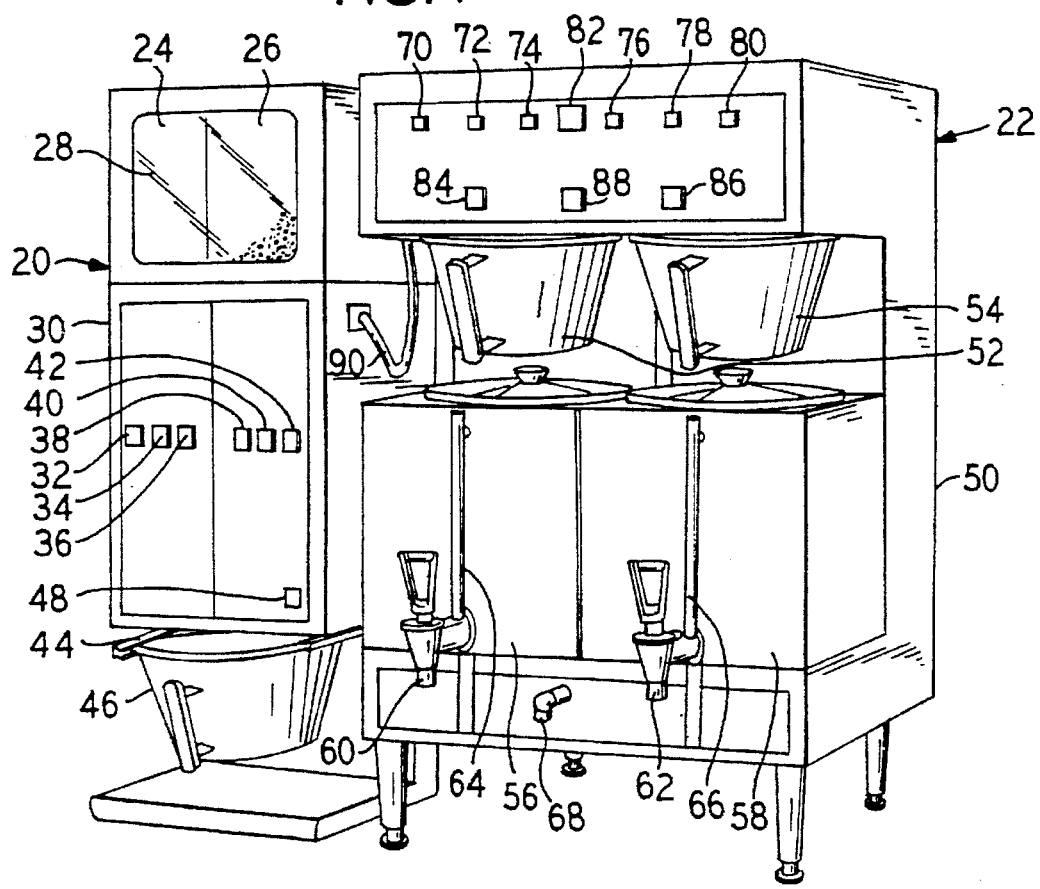
FIG. 1 is a perspective view of a coffee grinder and a coffee brewer connected of interlocked operation according to the principles of the present invention.

In FIG. 1 is shown a coffee grinder 20 and coffee brewer 22 connected for interlocked operation according to the present invention. The coffee grinder 20 has two compartments 24 and 26 for storing whole beans, as can be seen through a window 28. Although any type of coffee may be stored in the two compartments, the most common use of such two compartment grinders is that one compartment 24 holds regular coffee beans and the other compartment 26 holds decaffeinated coffee beans. A grinder housing 30 includes several size selection switches on the front panel, including for example, a 12 cup regular selection switch 32, a 24 cup regular selection switch 34, a 36 cup regular selection switch 36, and 12, 24, and 36 cup selection switches 38, 40, and 42, respectively, for the decaffeinated coffee. The lower portion of the grinder housing 30 has a filter basket holder 44 in which is shown a filter basket 46. A power switch 48 is provided on the front panel.

The coffee brewer 22 of the illustrated embodiment includes a brew housing 50 having two brewers with respective brew baskets 52 and 54 above two coffee canisters 56 and 58. Each canister 56 and 58 has a tap spout 60 and 62 and a vertical level indicator tube 64 and 66 which shows in a glass sight the level of the coffee in the canister. Below each canister 56 and 58 is a warmer (which is not visible in the view of FIG. 1). A hot water tap 68 extends from the lower front of the housing 50.

The top portion of the brew housing 50 includes a number of brew size selection switches, including, for example, a 12 cup brew switch 70, a 24 cup brew switch 72, and a 36 cup brew selection switch 74 for the left hand brewer, and a similar arrangement of a 12 cup brew switch 76, a 24 cup brew switch 78, and a 36 cup brew selection switch 80 for the right hand brewer. Each of the switches 70–80 shown in the drawing is a lighted switch for the sake of clarity in the drawing, although it may be preferable in some instances to provide a separate light for each switch, such as above or below each switch. In addition, the front panel includes a power switch 82, on/off switches 84 and 86 for each of the warmers, and a hot water dispense switch 88 which controls the flow of hot water from the hot water tap 68.

A communication link 90 extends between the coffee grinder 20 and the coffee brewer 22. The communication link 90 is removable by being disconnected at each end from the grinder 20 and brewer 22. When the communication link is removed, the grinder 20 and brewer 22 operate as stand alone units.

Operation of the Interlock Control

Figure 2:
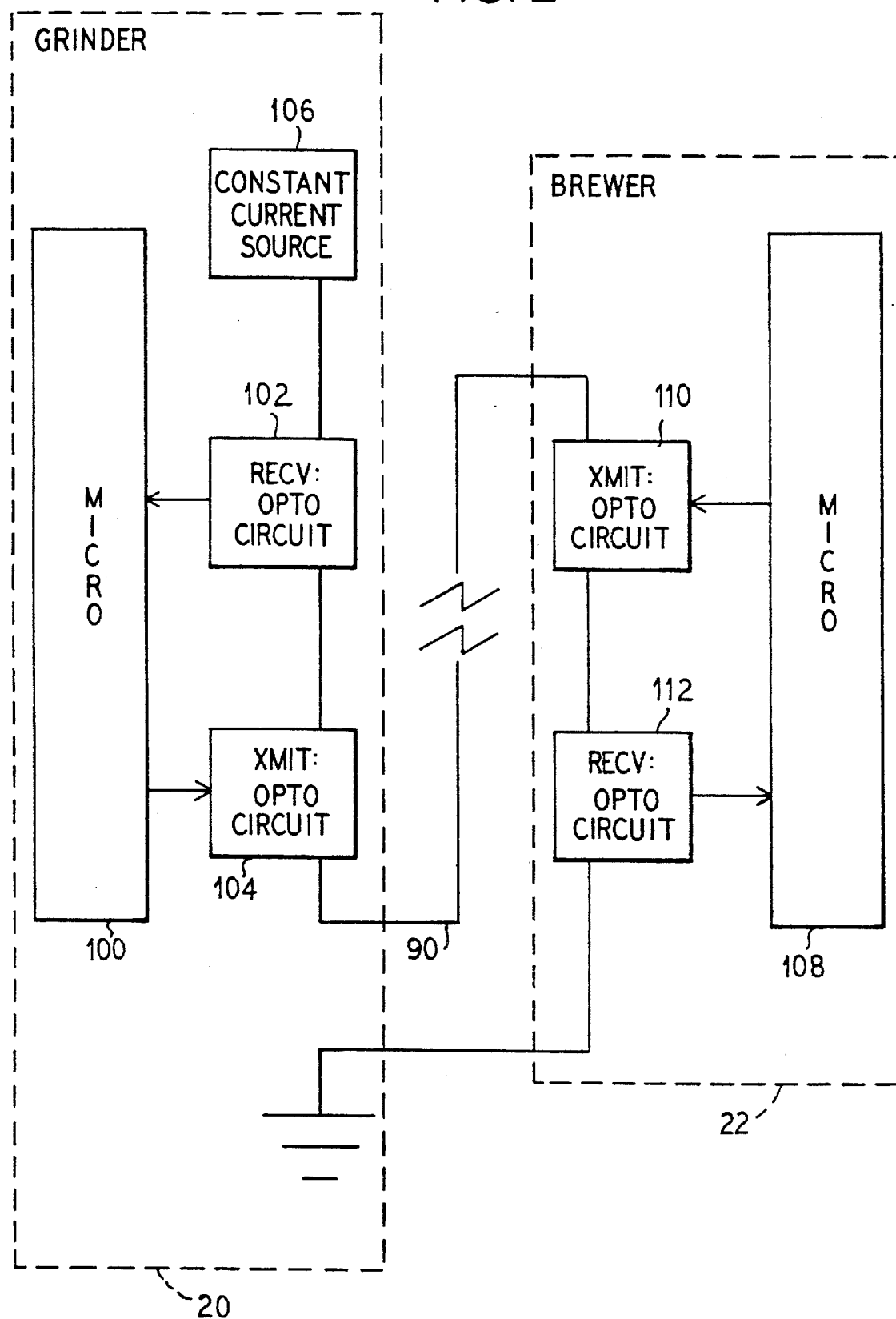
FIG. 2 is a block diagram of the coffee grinder and the coffee brewer with the interlock communication link of the invention.

A functional block diagram of the/interlock control for the present system is shown in FIG. 2. In the grinder 20 is a microprocessor 100 which is connected to a receive circuit 102 that inputs data to the microprocessor 100 from the communication link 90 and a transmit circuit 104 that outputs data from the microprocessor 100 to the communication link 90. The receive circuit 102 and the transmit circuit 104 include optical couplers in the preferred embodiment. The communication link 90 in the present embodiment is a current loop and is, therefore, connected to a constant current source 106 in the grinder 20. The current loop, of course, includes the positive and ground leads, as shown. In the brewer is also a microprocessor 108, which communicates over the communication link 90 through a transmit circuit 110 and a receive circuit 112.

The connection of additional brewers to the grinder is easily accomplished by connecting them into the current loop so that they receive the grinder size pulses and have an opportunity to transmit acknowledgement pulses, as will be discussed in conjunction with FIG. 13.

Figure 3:
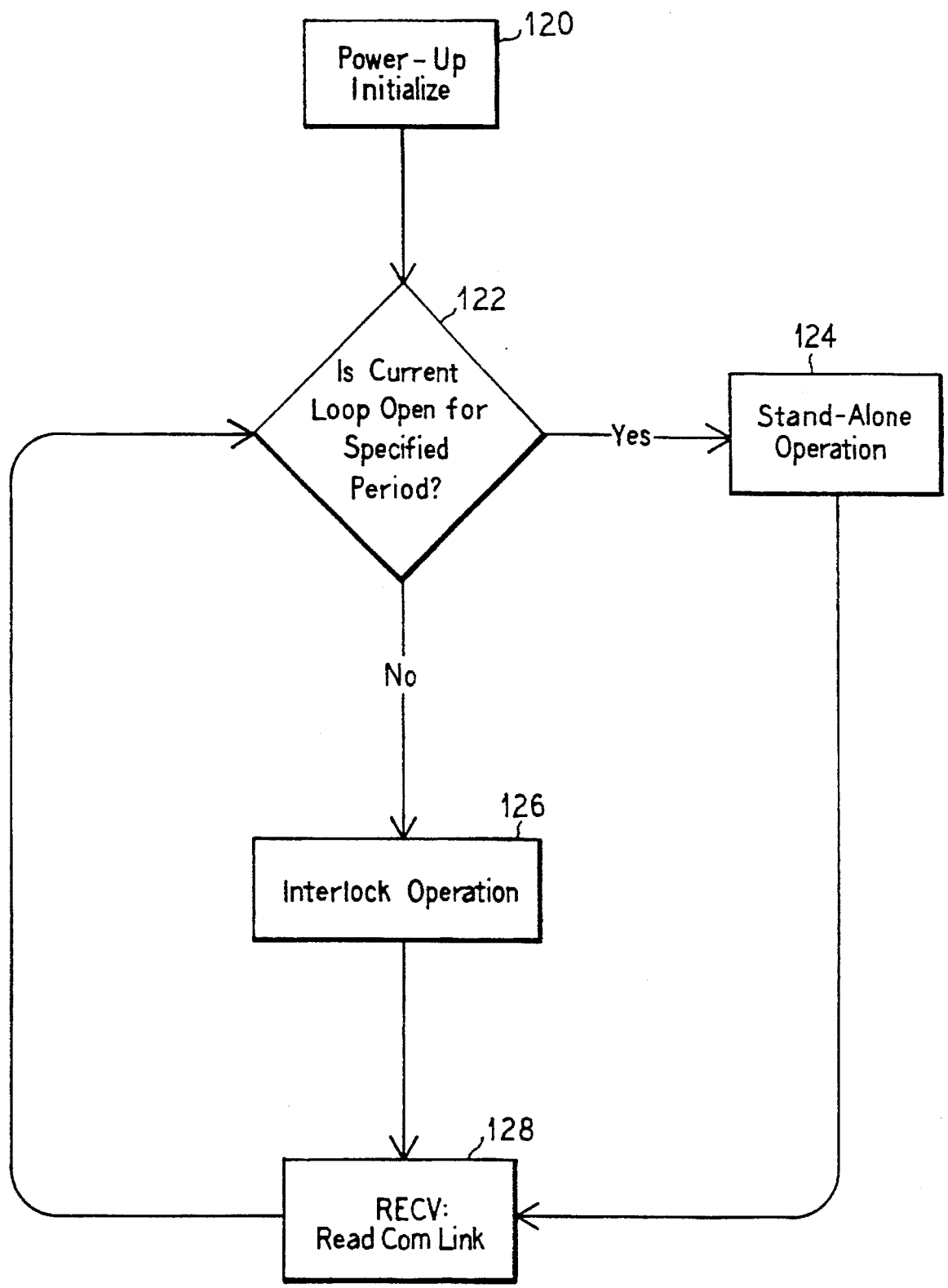
FIG. 3 is a flow chart showing the operation of either the grinder or the brewer.

A flowchart of the overall operation of either the grinder or the brewer control is shown in FIG. 3. The same process steps apply to both. The first block 120 refers to the power-up of the control when power is applied to the grinder or brewer unit. After initialization of the control circuit, a decision is made at block 122 as to whether the current loop of the communication link is open and has been so for some specified period of time. If the answer is yes, the control unit is switched to stand alone operation, as indicated by block 124. The stand alone operation of the grinder and the brewer is set out in greater detail hereinafter in conjunction with FIG. 8.

If the current loop of the communication link is found not to be open after the specified period of time in the block 122, the unit is switched to interlock operation, as indicated by block 126. The interlocked operation of the brewer and of the grinder are each set out in greater detail hereinbelow in conjunction with FIGS. 4 and 5.

Following the stand alone operation 124 and the interlocked operation 126, the communication line is checked at block 128 for signals. In other words, the control unit checks the receive unit on the communication link. After checking for data on the communication link at the block 128, the process returns to the decision block 122 to check whether the communication link has been disconnected. The process embodied in the flowchart of FIG. 3, as in the following flowcharts, is implemented by programming the processor in the appropriate software language according to known programming techniques.

Figure 4:
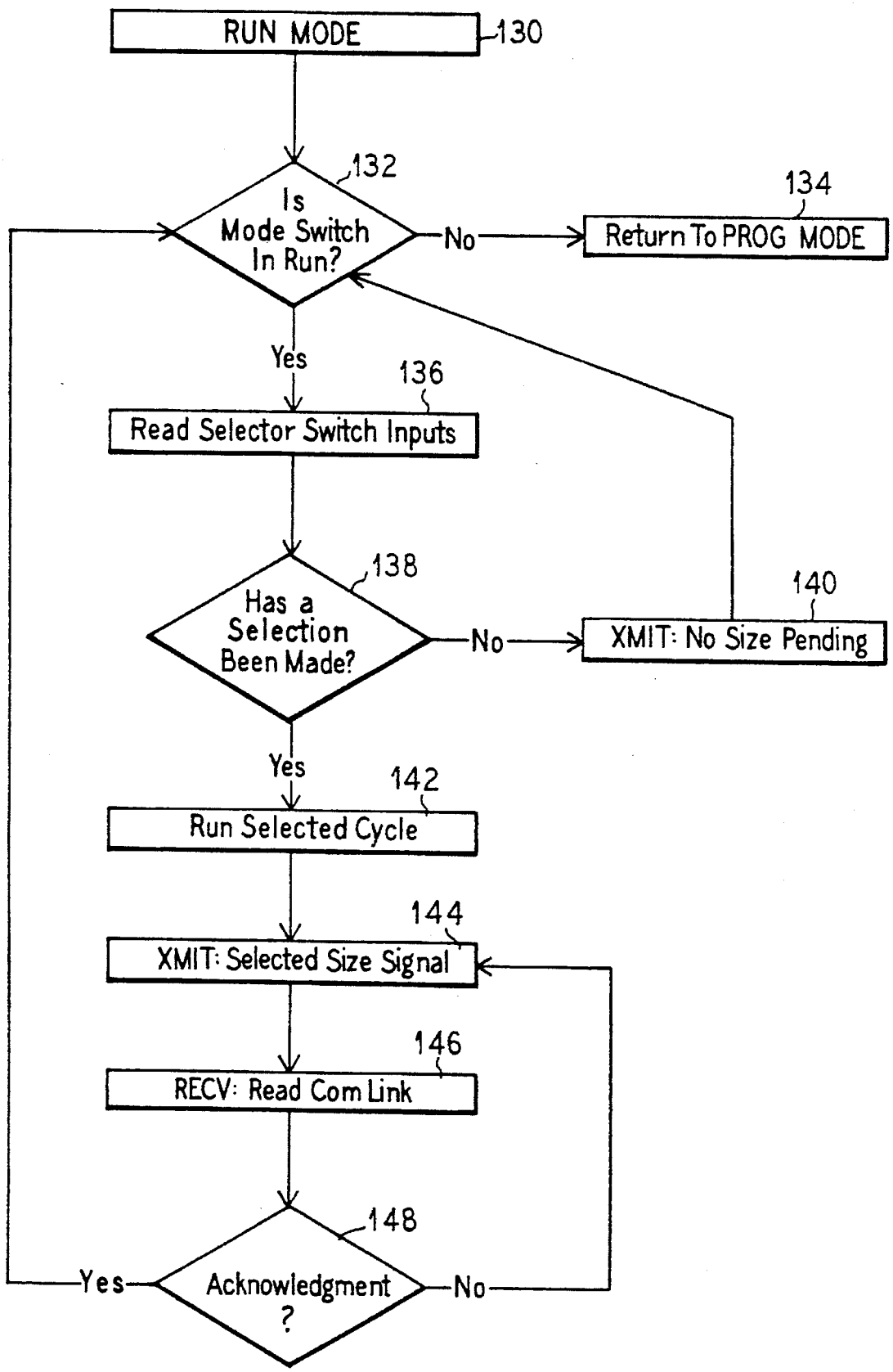
FIG. 4 is a flow chart of the grinder run mode, or interlocked mode, operation.

The interlocked operation, also referred to as run mode, of the grinder is illustrated in the flowchart of FIG. 4. The first block 130 referred to as run mode initiates the operation of the grinder. A first determination is made at block 132 to determine whether a run switch inside the grinder housing is switched from a run position to a program, or calibrate, position. If in the program position the process goes to the program mode, which will be described later, at block 134. If, on the other hand, the mode switch is in the run mode, the selector switch inputs are read at block 136. The selector switches are the controls on the front panel of the grinder by which the user selects the grind capacity, and as in the present example, the type of coffee to be ground. If a size selection via the switches has not been made, as determined at block 138, then a signal is transmitted on the communication link that no size is pending, as shown at block 140. The process returns to the decision block 132, and awaits a size selection.

Once a size selection is made by the user, the selected size grinding cycle is run at block 142. This involves operation of the auger motor and the grinding motor for the predetermined time interval. A signal corresponding to the selected size is transmitted over the communication line at block 144. After transmission of the size signal at block 144, the communication link is checked for an acknowledgement signal from the brewer that the corresponding brew cycle is selected, as shown at the block 146. If the acknowledgement has not been received, as determined at block 148, the size signal is once again transmitted at the block 144. The process continues in this loop until the acknowledgement is received, which prevents the grinder from reading the selector switches for further grind selections.

When the acknowledgement is received, at the block 148, the process is returned to the block 132 at the beginning of the flowchart. The acknowledgement indicates that the brewer has been started, as will be discussed hereinafter.

Figure 5:
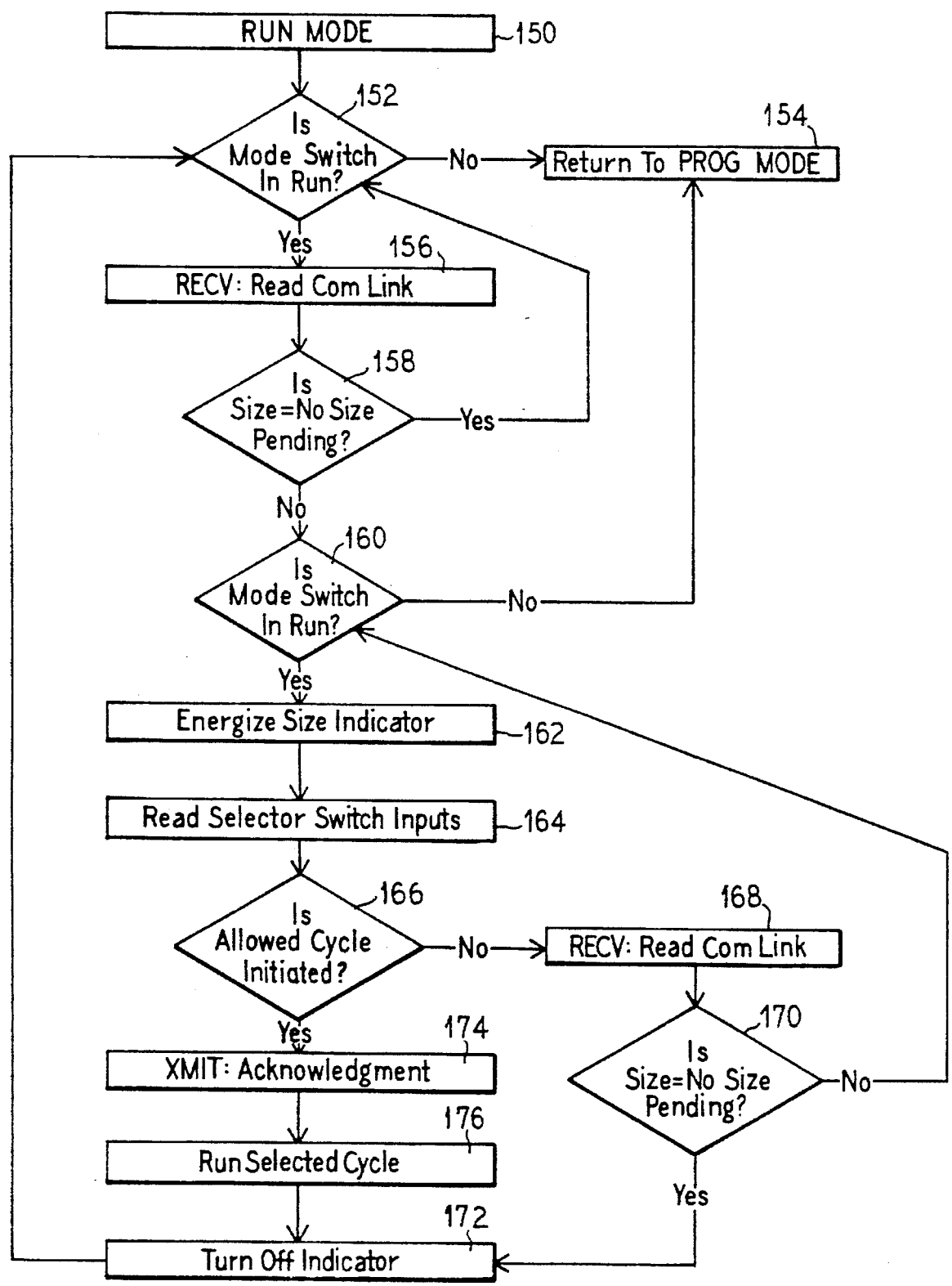
FIG. 5 is a flow chart of the brewer run mode, or interlocked mode, operation.

In FIG. 5 is shown the interlocked run mode operation of the brewer. The run mode begins at block 150, after which a determination is made at block 152 as to whether the program/run mode switch is in the run mode. If the switch is not in the run mode, then the switch is set for the program mode, as shown at block 154. The program mode will be discussed hereinafter. If at the decision block 152 the determination is made that the mode switch is in the run position, the process proceeds to check the receiver for the data on the communication link, at block 156. The process is looking for information from the grinder indicating that a quantity of coffee has been ground and what that quantity is.

If, after checking the communication link, the processor finds a signal indicating "no size pending," as determined at block 158, the process returns to the block 152. The "no size pending" signal indicates that no quantity of coffee beans has been ground, and so the brewer is, in effect, waiting for the coffee to be ground. If the decision block 158 finds some size, or quantity, signal on the communication link, the process continues on to block 160 where the determination is again made as to the status of the mode switch. Again, if the mode switch is not in the run mode, the processor returns to the program mode, at the block 154. If yes, the process continues to block 162 where a size indicator on the front panel of the brewer corresponding to the size signal received on the communication link is energized. In other words, if the size signal received in step 156 from the grinder indicates that coffee beans for 24 cups has been ground, then the processor illuminates the indicator light showing that 24 cups are to be brewed.

For the sake of convenience, it is preferred that the illuminated indicator either be immediately adjacent the corresponding, i.e., 24 cup, brew start switch, or that the brew start switch itself illuminate. That tells the operator which quantity of coffee beans has been ground and which quantity of coffee is to be brewed from the ground beans.

Other indicator means are, of course possible, including, for example, an LCD (liquid crystal display) panel or other alpha numeric display for displaying the size to be brewed. While not as intuitive as a lighted indicator adjacent the brew switch to be selected, this would have the advantage of displaying additional information as well.

The process block 164 indicates that the processor reads the brew start switches, also termed selector switch inputs, for an input. The processor is waiting for the operator to select a brew cycle. At block 166, the determination is made as to whether the brew cycle corresponding to the one indicated at the block 162, and to the quantity of coffee beans ground, has been selected by the operator. If not, the receiver is again checked, at block 168, for a size signal. As above, if the signal on the communication link is found to be a "no size pending" signal as determined at block 170, then the indicator light is turned off, at block 172. If instead, a size signal is found on the communication link at the block 170 and the corresponding size brew cycle has yet to be selected as determined at the block 166, then the process returns to the block 160 to continue lighting the corresponding size indicator lamp on the brewer and waiting for the appropriate brew cycle switch to be selected.

Returning to the block 166, if the proper cycle is selected then an acknowledgement signal is forwarded on the communication link via the transmitter at the block 174. The process continues as the selected brew cycle is run by the brewer, at block 176. Thus, only the proper amount of coffee is brewed from the quantity of beans that were freshly ground. Once the brew cycle is completed, the indicator light can be turned off, at the block 172, and the process returns to the initial steps at the block 152.

Thus, there is shown and described an interlock control for a coffee grinder and coffee brewer, which assures that the proper quantity of coffee is brewed each time for the quantity of beans that are ground.

Learn Mode Operation

Figure 6:
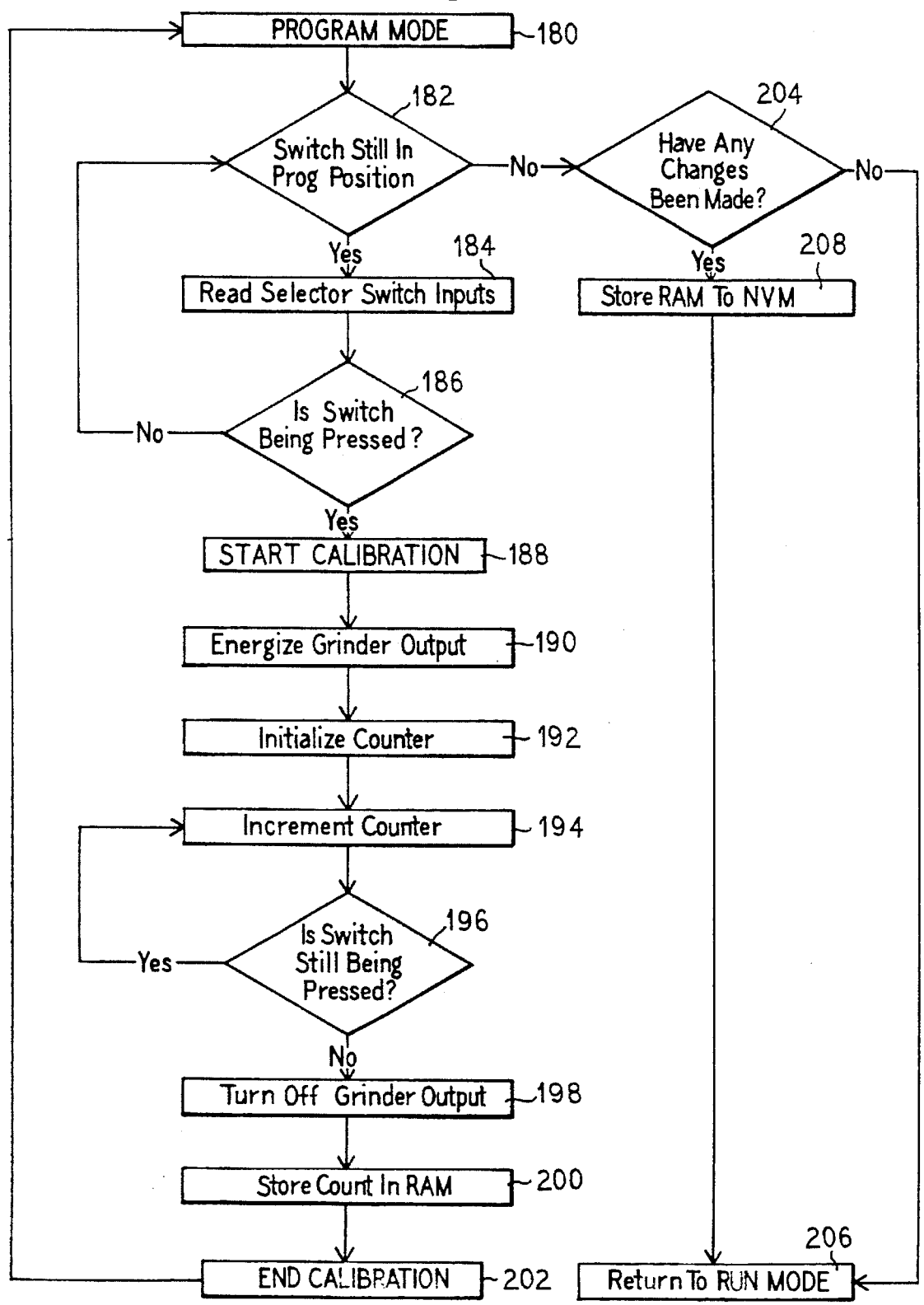
FIG. 6 is a flow chart of the grinder program mode, or calibrate mode, operation.

The present invention also incorporates a learn mode feature providing easy set-up and calibration regardless of variations in environmental conditions. In FIG. 6 is set out the calibration process, also referred to as a programming mode, for the coffee grinder. The program, or calibrate, mode is entered, at block 180, from the grinder run process shown in FIG. 4. A determination is made at block 182 as to whether the mode switch in the grinder is still in the program mode or whether it has been changed to the run mode. An operator or installer, such as during set up of the grinder switches the run/program switch to the program mode to calibrate the grinder. If the run/program switch is still in the program mode, the calibration process continues at block 184 by reading the selector switches of the grinder. If the selector switch is not being pressed by the operator, the block 186 returns the process to the block 182. If, on the other hand, one of the selection switches is being operated, then the calibration begins at block 188. The operator places a coffee quantity measure vessel under the grinder output to catch the ground coffee beans as it is being ground. First, the grinder is energized at block 190 so that the grinding of the coffee beans begins. A counter in the control circuit of the grinder is initialized at block 192 and incrementing of the counter is begun at block 194. After one increment of the counter, which here is acting as a timer, the selection switch is checked at block 196 to determined if it is still being pressed. If the operator watching the measure vessel fill sees that it has filled to the desired level, the operator releases the selection switch. If the measure vessel is not yet filled to the desired level, the operator continues to press on the selector switch, so that the process is returned to the block 194 for further incrementing of the counter. When the measure is filled to the desired level, which depends on the strength and type of coffee desired, the operator releases the selection switch and the process continues to block 198, where the grinder is turned off. The count reached by the counter, which indicated the length of time required for the grinder to grind the desire quantity of coffee, is stored in RAM (random access memory) at block 200. The block 202 then indicates that the end of the calibration cycle, at least for this selection switch, has been reached and returns the process to the block 180.

In one embodiment, a top-off feature is provided. Since the brewed coffee depends more on the weight of the ground beans than on the volume, the user conducting the calibration can stop the calibration process at the block 198 when the quantity of ground beans is believed to be correct. The ground beans may then be weighed or otherwise measured. An additional amount of ground beans may then be added by once again pressing the same selection switch to "top-off" the quantity of grounds. The count for this additional amount is added onto the original count, and the process continues.

The foregoing description has only detailed a single pass through the calibration cycle during which the grinding time for a single selection switch was set. Each selection switch must be individually calibrated, so in the illustrated embodiment of FIG. 1 the calibration cycle must be run six times, one for each of the size selection switches. While it may be possible to, for example, calibrate the 24 cups switch on the regular coffee side of the grinder and then have the same calibration setting apply for the 24 cup decaffeinated switch, the regular and decaffeinated coffees may be of different strengths and so require different grinding times to compensate. Of course, if it is desired, the calibration time for one side may be applied to the corresponding selection switch of the other side of the two sided grinder. It is also possible to calibrate the grinder to the 12 cup capacity and then to multiply the grind time by the appropriate amount for the 24 and 36 cup capacity switches, for example, thereby avoiding repeated calibration cycles.

Referring again to FIG. 6, if the run program switch is determined at the block 182 to be in the run position, then a determination is made at block 204 as to whether any changes have been made in the calibration times by comparing the values stored in RAM at block 200 to values in the permanent memory of the grinder control. If no changes were made, the process returns to the run mode at block 206. If changes are found, then the new counter values in the RAM are stored in the non-volatile memory (NVM), at block 208. In some embodiments, the new values are always written to the non-volatile memory without checking for changes. The process then returns to run mode.

Figure 7:
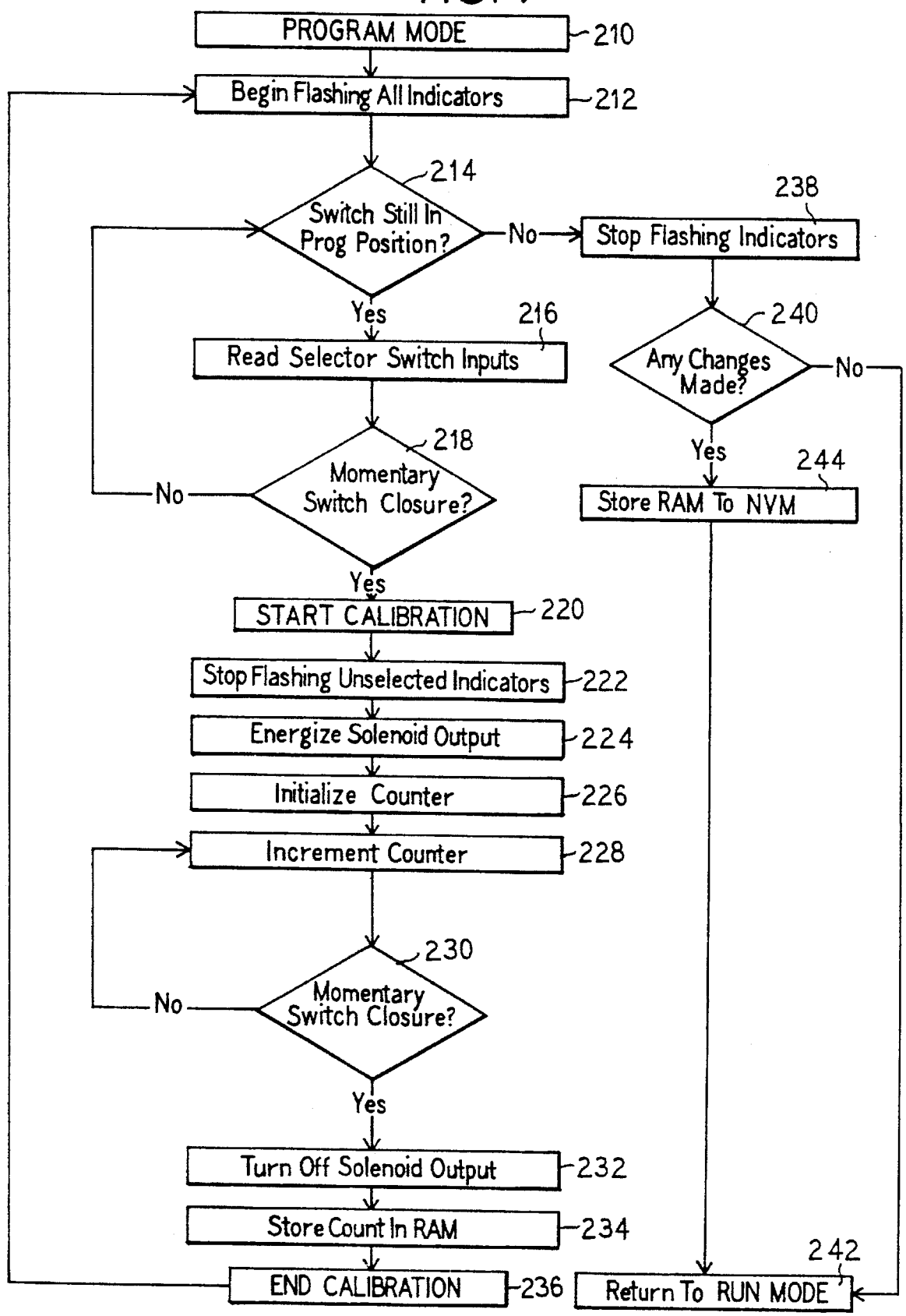
FIG. 7 is a flow chart of the brewer program mode, or calibrate mode, operation.

The process steps for calibration of the brewer are shown in FIG. 7. The calibration of the brewer is important since it is connected directly to a municipal water supply, for example, and water pressure can vary from one supply to another. The quantity of coffee being brewed is determined by the amount of time that the water valve is open. Thus, the brewer must be set up to admit the correct quantity of water for the water pressure and flow rate of the particular installation. As in the grinder calibration, the programming of the brewer begins at block 210 with a transfer from the run process of FIG. 5 to the program mode or calibrate mode of FIG. 7. In the first step at block 212, the brew indicators are all flashed to indicate the program mode. The position of the run/program switch is checked at block 214, and if found to still be in program position, the selector switches are read at block 216.

The operator seeking to calibrate the brewer would place a measuring vessel below the brew output and press one of the brew select switches. If, at block 218, no select switch is yet pressed, the process returns to the block 214. If the operator has pressed one of the selection switches, the calibration process is started at block 220. The selection switches which were not selected by the operator cease flashing at block 222, and the solenoid which operates the water valve is operated at block 224. Once the solenoid opens the water valve and the water begins to flow into the measuring vessel, the counter is initialized at block 226 and incrementing of the counter begins at block 228.

The operator waits until the measuring vessel has filled to the desired amount, for example, 24 cups of water, and again presses the brew select switch that is being calibrated. If this switch has not yet been pressed, as determined at block 230, the process returns to the block 228 to increment the counter. When the selection switch is again closed, the process continues to block 232 to turn off the water valve by de-energizing the solenoid. The count attained by the counter is stored in RAM at block 234 and the calibration of that selection switch is completed at block 236 so that the next selection switch may be calibrated. The programming sequence starts over at the block 212.

Once all brew size selection switches have been calibrated, the program/run switch is changed to the run position as determined at the block 214, and the flashing of the indicator lights is stopped at block 238. The determination is made as to whether any changes have been made in the timing of the valve openings by comparing the contents of the RAM to a non-volatile memory at block 240. If no changes have been made, the process is returned to the run mode at block 242, but if changes have been made they are written into the non-volatile memory (NVM) at block 244 and then the process returns to the run mode. As above, the new values may be written in any event.

The grinder and brewer are, therefore, both calibrated to brew the correct strength of coffee without the trial and error set up required of earlier devices.

Stand Alone Operation

Figure 8:
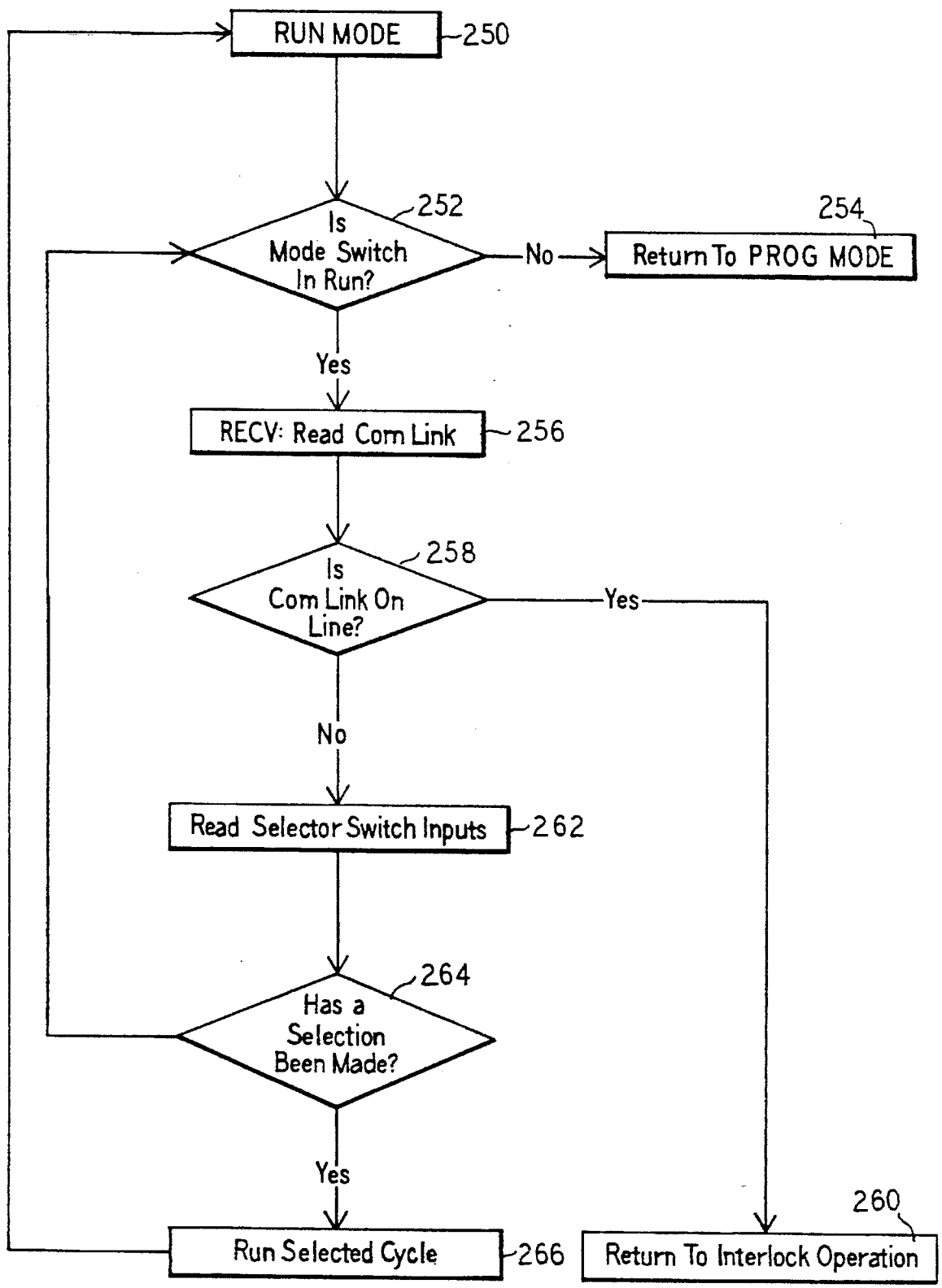
FIG. 8 is a flow chart of the stand alone operation of either the coffee grinder or the coffee brewer.

When the communication link between the coffee grinder and the coffee brewer is disconnected, each unit operates as a stand alone unit. The grind and brew cycles may be started at any time independently of one another. FIG. 8 illustrates the stand alone operation of either the grinder or the brewer. The stand alone operation goes into effect when the communication link is disconnected. The process begins at block 250 and a determination is made as to whether the mode switch is at the run or program position at the block 252. If in the program position, the process is transferred to the program mode at block 254, while if the switch is at the run mode, the receive unit is checked for data on the communication link at block 256. At block 258, the determination is made as to whether the communication link is connected, so that control is transferred to the interlocked operation as shown at block 260, or whether the link is disconnected. If the communication link is disconnected, the selector switches are checked for an input at block 262 and, when the selection of a brew or grind cycle is made, as determined at block 264, the cycle is run at block 266. If the selection of a brew or grind cycle is not made, the process returns to the block 252 to again check the inputs. After the selected brew or grind cycle is run, the process returns to initial block 250 so that another brew or grind cycle may be run.

Thus, the control of the present invention provides either interlocked operation or automatic switching to stand alone operation, as well as a calibration mode during set up.

Grinder Circuit

Figure 9:
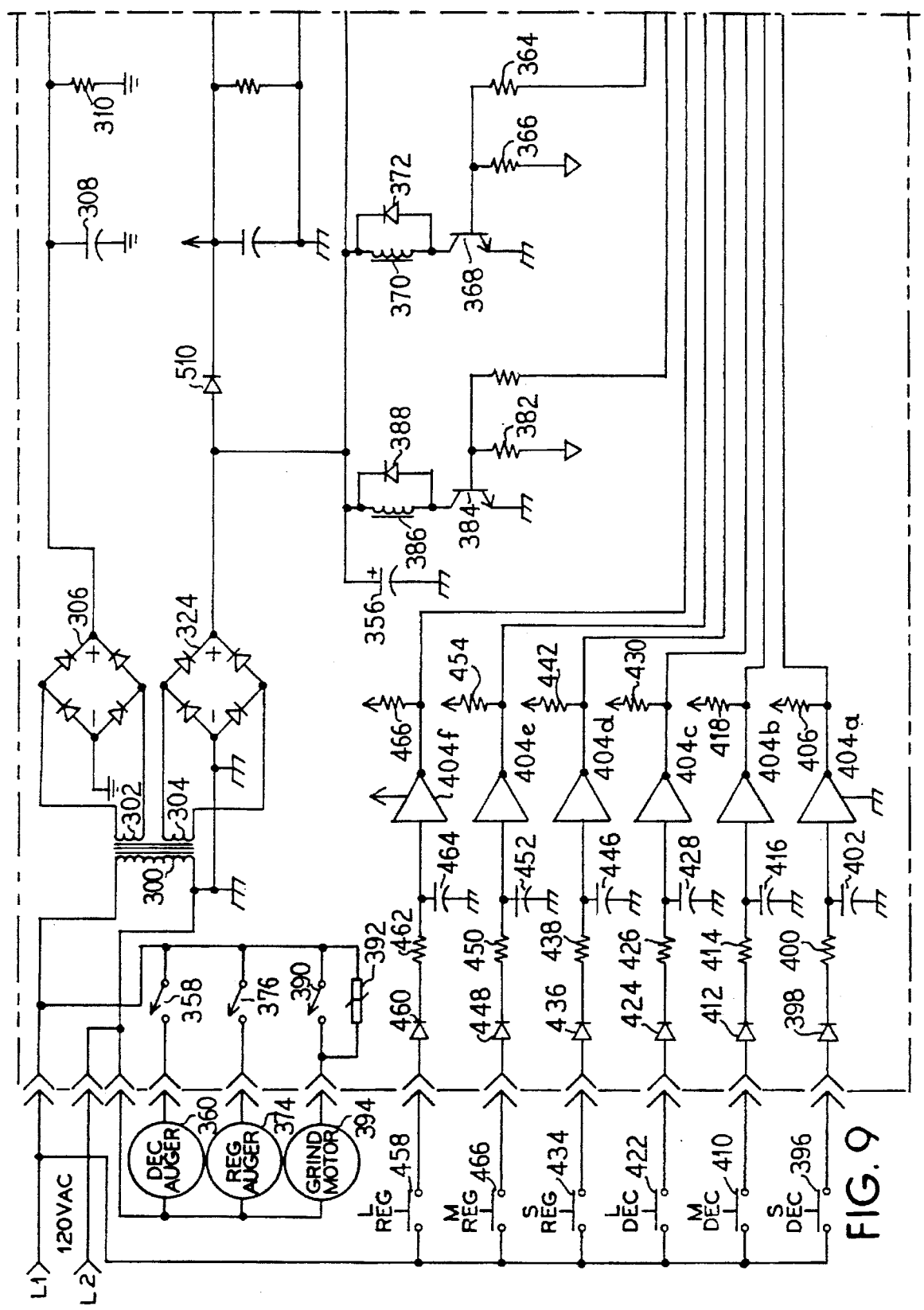
FIG. 9 is a circuit diagram of a first portion of the grinder control circuit according to a preferred embodiment of the present invention.
Figure 10:
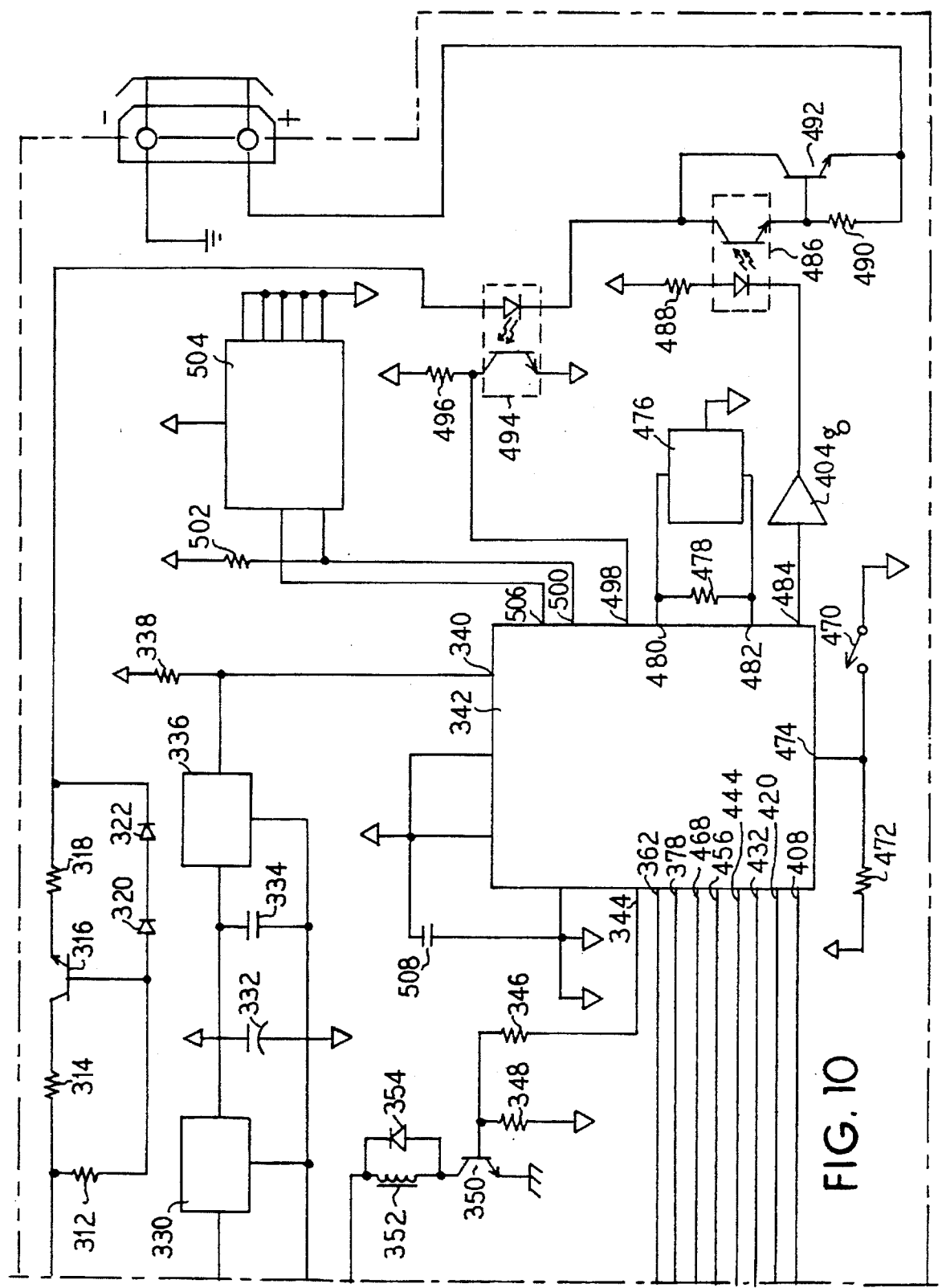
FIG. 10 is a circuit diagram of a second portion of the grinder control circuit of FIG. 9.

The control circuitry of the invention which carries out the functions described above and shown in the foregoing flowcharts is shown for an exemplary embodiment in detail in FIGS. 9, 10, 11 and 12. The control circuit for the grinder is shown in FIGS. 9 and 10. A broken outline in the Figures indicates the control circuit and shows connections to the elements of the grinder unit, or brewer unit, respectively. In particular, the circuit includes a power input portion that includes a transformer that has a single primary winding 300 connected to an AC line power and two secondary windings 302 and 304. The first secondary winding 302 supplies power to a constant current source for the communication link that includes a bridge rectifier 306, a filter capacitor 308, a bleeder resistor 310, a resistor 312, a resistor 314, a transistor 316, a resistor 318, and two diodes 320 and 322. The power supply circuit includes, in FIG. 9, a bridge rectifier 324, a diode 510, a filter capacitor 326, a bleeder resistor 328, a voltage regulator 330, a capacitor 332 and capacitor 334. A power-up reset circuit includes a low voltage detector 336, a pull-up resistor 338 and reset pin 340 of an integrated circuit 342, which is a 68HC705J2 microcontroller chip.

As discussed above, the exemplary embodiment has two bins for coffee, each with an auger to move the beans to a grinder. Here, the two bins and their respective parts are referred to as regular, or reg, and decaffeinated, or decaf, although other types of coffee may, of course, be placed in the bins. A decaf auger output is a port pin 344 of the microcontroller chip 342, a base resistor 346, a pull-down resistor 348, a transistor 350 for driving a relay, a relay winding 352, and a diode 354 across the winding. A filter capacitor 356 (FIG. 10) and the bridge rectifier 324 provide power to the relay winding. The armature of the relay winding 352 is connected to operate a switch 358 which applies power to the decaffeinated auger 360 so that the beans in the decaffeinated bin are moved to the grinder.

A regular auger output is controlled from a port pin 362 of the microcontroller chip 342, through a base resistor 364 to a pull-down resistor 366, a transistor 368, a relay winding 370, and a diode 372, which is across the relay 370. A regular coffee auger 374 is switched on and off by the switch 376 of the relay winding 370, which moved the regular beans to the grinder.

The grind motor output is controlled from a port pin 378 of the microcontroller chip 342. The control signals are transmitted through a base resistor 380 to a pull-down resistor 382 and a transistor 384 which drives a relay winding 386 across which is connected a diode 388. The switch 390 for the winding 386 has a MOV device 392 connected thereacross. The switch 390 controls the operation of a grinder motor 394, which drives the grinder (not shown). The grinder is turned on when either the decaf or the regular auger are operated.

A small decaf switch 396 is connected to an input of the present control, which input is connected to a half-wave rectifier 398, a current limiting resistor 400, a filter capacitor 402, and ½th of a darlington array amplifier 404a. A pull-up resistor 406 is provided at the output of the amp 404a connected to a port pin 408 of the microcontroller chip 342. A medium decaf switch 410 has a similar arrangement including a half-wave rectifier 412, a current limiting resistor 414, a capacitor 416, ½th of the darlington array 404b, a pull-up resistor 418 to a port pin 420 of the microcontroller 342. A large decaf switch 422 is connected through a half-wave rectifier 424, a current limiting resistor 426, a filter capacitor 428, ½th of the darlington array 404c, a pull-up resistor 430 to a port pin 432 of the microcontroller 342.

Connections of the selection switches to the microcontroller 342 include, for a small regular switch 434, a half-wave rectifier 436, a current limiting resistor 438, a filter capacitor 440, ½th of the darlington array 404d, a pull-up resistor 442 to a port pin 444 of the microcontroller 342. A medium regular switch 446 is connected via a half-wave rectifier 448, a current limiting resistor 450, a filter capacitor 452, ½th of the darlington array 404e, a pull-up resistor 454 and a port pin 456 of the microcontroller 342. A large regular switch 458 is connected through a half-wave rectifier 460, a current limiting resistor 462, a filter capacitor 464, ½th of the darlington array 404f, a pull-up resistor 466 and a port pin 468 of the microcontroller 342.

A PROG/RUN mode switch circuit includes a switch 470 (FIG. 10), a pull-up resistor 472 and a port pin 474 of the microcontroller 342. A microcontroller oscillator circuit includes a ceramic resonator 476, a resistor 478, a pin 480 and a pin 482 of the microcontroller 342. A communication link transmit circuit includes a port pin 484 of the microcontroller 342, ½th of the darlington array 404g, a opto-coupler 486, a current limiting resistor 488, a resistor 490 and a transistor 492. A communication link receive circuit includes an opto-coupler 494, a pull-up resistor 496 and a port pin 498 of the microcontroller 342. A non-volatile memory circuit includes a port pin 500 of the microcontroller 342, a pull-up resistor 502, a non-volatile memory 504 and a port pin 506 of the microcontroller 342. A capacitor 508 is a high frequency bypass capacitor for the microcontroller 342.

Circuit operation:

At power-up, the primary winding 300 of the transformer is energized. This primary winding 300 energizes the two separate secondaries 302 and 304. The bridge rectifier 306 full-wave rectifies the voltage from the secondary 302 which is then filtered by the capacitor 308 that becomes the supply voltage for the constant current circuit. The constant current source is set by the value of the resistor 318 with the voltage drop across the resistor 318 being approximately one diode drop. The diodes 320 and 322 in series is equal to two diode drops. The base-to-emitter diode drop is subtracted from these two diode drops, thus leaving the voltage drop across the resistor 318 equal to approximately one diode drop. The resistor 314 limits the power dissipation of the transistor 316. The resistor 312 supplies the base current to bias the transistor 316. When the voltage across resistor 318 exceeds approximately one diode drop, the transistor 316 turns off maintaining constant current. The bridge rectifier 324 full-wave rectifies the voltage from the secondary 304, which is then filtered by the capacitor 356 to become the source voltage for the relays 352, 370 and 386. The voltage then passes through a diode 510 and is filtered by the capacitor 326 and becomes the source voltage for the voltage regulator 330. The voltage regulator 330 regulates this voltage to a voltage level of +5 v which is used as the regulated supply for the circuitry. A reset circuit holds the microcontroller line 340 low in reset until the +5 v supply is approximately 4.69 v, at which time the output of the reset circuit becomes an open circuit and the reset pin 340 of the microcontroller 342 is pulled to +5 v through the resistor 338. At this time, the microcontroller 342 begins to run. The microcontroller 342 then initialize all port pins. The port pins 344, 362 and 378 are set as outputs and are low after power-up leaving the relays 352, 370 and 386 de-energized.

The port pins 408, 420, 432, 444, 456 and 468 are set as inputs and are high when a switch is not pressed. The port pin 474 is set as an input and is high when the PROG/RUN mode switch 470 is in the PROG position and low when the PROG/RUN switch is in the RUN position. The port pin 484 is set as an output and is high to close the current loop and low to open the current loop (to transmit). The port pin 498 is set as an input and is low when the current loop is closed and high when the current loop is open (to receive). The port pin 500 is a bi-directional port pin. It is set as an output when sending data to the non-volatile memory 504. It is set as an input when reading the non-volatile memory. The port pin 506 is set as an output. It is used when the pin 500 is an output to set-up a read or write sequence for the non-volatile memory and to clock data in or out after the read or write operation as been initiated.

When the PROG/RUN mode switch 470 is in the RUN position (the pin 474 is low) and no grind cycles are pending, the microcontroller 342 waits for a low signal on one of the port pins used for the selector switch input (408 through 468) to initiate a cycle when a selector switch is pressed, the positive alternation of L1 with respect to L2 is rectified by the half-wave rectifier of the respective switch input and filtered by the capacitor on the input of the darlington transistor 404 (represented by the inverter symbol) turning it on. The output of the darlington transistor 404 goes low and the respective cycle is initiated. At this time, the microcontroller 342 reads the stored timer value. The port pin 378 goes high providing base current for the transistor 384 through the resistor 380. The transistor 384 turns on, energizing the relay 386. If the selection was decaf, the pin 344 goes high providing base current for the transistor 350 through the resistor 346. The transistor 350 turns on, energizing the relay 352. If the selected cycle was regular, the port pin 362 goes high providing base current for the transistor 368 through the resistor 364. The transistor 368 turns on, energizing the relay 370.

After the time period for the selected cycle has elapsed, the port pin for the respective auger output goes low removing the base current from the auger transistor to turn it off and, thus, de-energize the auger relay. The pin 378 will remain high for an additional ten seconds at which time it goes low removing base current from the transistor 384 and turning it off, thereby de-energizing the grind motor relay 386.

The microcontroller 342 will now send the size signal on the communication link. The port pin 484 goes low for a duration representing the sync pulse. The darlington transistor 404g connected to the pin 484 turns off. No current flows through the input LED of the opto-coupler 486. The output transistor of the opto-coupler 486 turns off and no base current flows through the transistor 492. The transistor 492 opens the current loop. When the pin 484 goes high, the darlington transistor 404g connected to the pin 484 turns on. Current flows through the input LED of the opto-coupler 486. The output transistor of the opto-coupler 486 turns on allowing base current through the transistor 492. The transistor 492 turns on, closing the current loop. After the sync pulse has been sent, the microcontroller 342 waits for a period of time then sends the size signal by opening the current loop as previously described. After the size signal has been sent, the microcontroller 342 waits for a further period of time. After this further time has elapsed, the controller 342 looks for a response from a brewer, of which there may be several in the loop, on the communication link. If a response is not received, the grinder control transmits again as previously described.

A brewer responds by opening the current loop. The microcontroller 342 senses that the current loop is open via the opto-coupler 494. When the current loop is closed, the input diode of the opto-coupler 494 is on. The transistor of the opto-coupler 494 is on, pulling the port pin 498 of the microcontroller 342 low. When the current loop is open, the input diode of the opto-coupler 494 is off. The transistor of the opto-coupler 494 is off (an open circuit) and the port pin 498 of the microcontroller 342 is pulled high through the resistor 496. When the response is received from the brewer or when the current loop is always open, a new grind cycle can begin.

When the PROG/RUN switch 470 is in the PROG position, i.e. is open, the port pin 474 is pulled high through the resistor 472. The grind time is programmed by pressing and holding the selector switch for the desired time. The grind relay 386 and the selected auger relay 352 or 370 activate as previously described. When the selector switch is released, the selected auger relay will turn off as previously described and the grind motor relay 386 remains on for an additional ten seconds as previously described.

When the PROG/RUN mode switch 470 is placed in the RUN position (is closed), the microcontroller 342 stores the count in the non-volatile memory 504. The port pins 500 and 506 of the microcontroller 342 ate outputs. After the write sequence is initiated, the serial data is sent on the port pin 500 and clocked into the non-volatile memory 504 by the port pin 506 and the microcontroller 342.

Brewer Circuit

Figure 11:
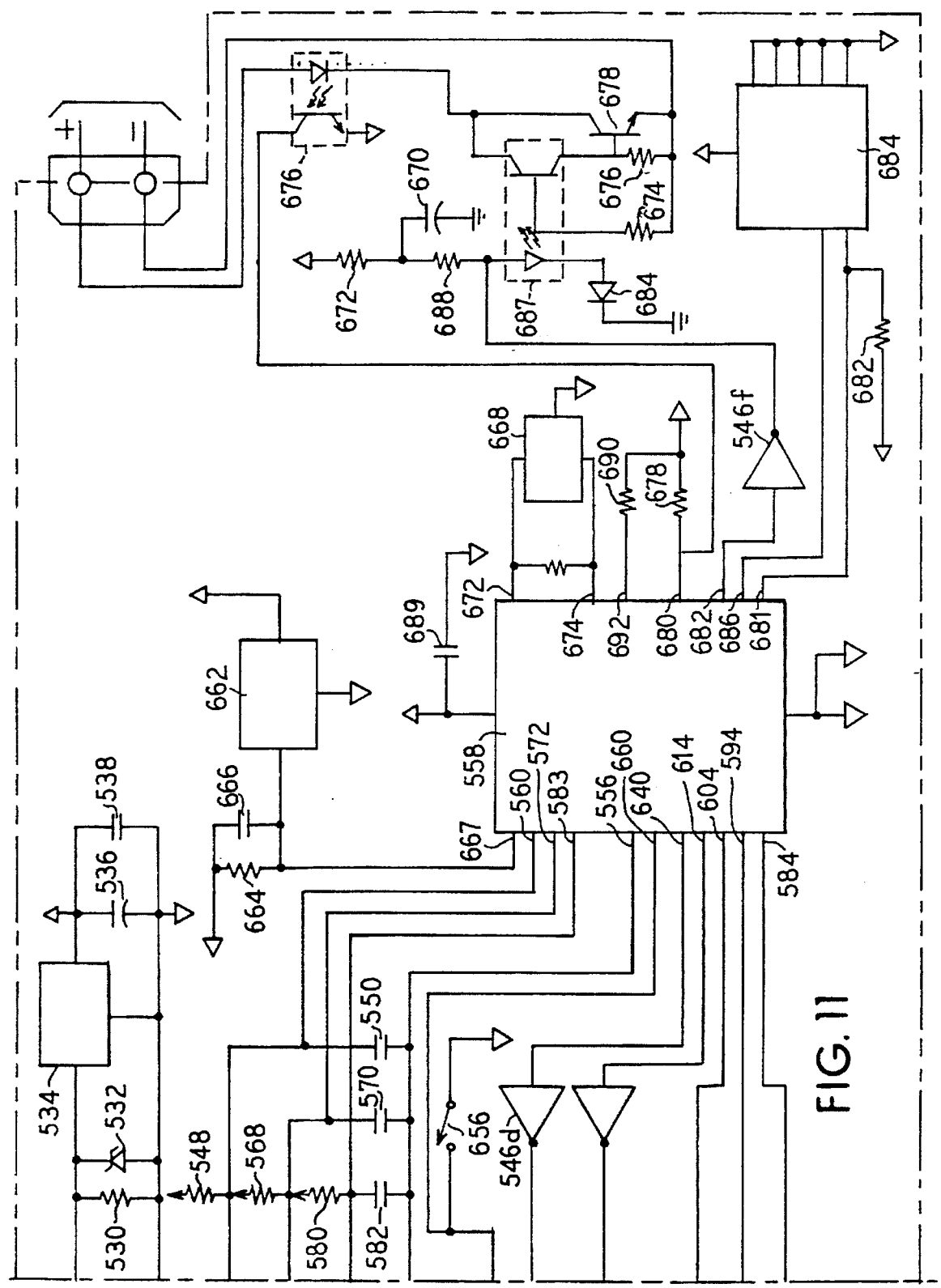
FIG. 11 is a circuit diagram of a first portion of the brewer control circuit according the a preferred embodiment of the invention.

FIGS. 11 and 12 show the detailed circuitry of the brewer control. The power supply circuit includes a half-wave rectifier 520, current limiting resistors 522 (which is a cuttable trace for use as a 240 V unit) and 524, a filter capacitor 526, a high frequency bypass capacitor 528, a bleeder resistor 530, a zener diode 532, a voltage regulator 534, a capacitor 536 and a capacitor 538. A small switch 539 is input through a half-wave rectifier 540, a current limiting resistor 544, a filter capacitor 542, ½th of a darlington array 546a, a pull-up resistor 548, a capacitor 550, a resistor 552, a diode 554, to a pin 556 of a microcontroller 558 and a port pin 560 of the microcontroller 558. A medium switch 561 is input through a half-wave rectifier 562, a current limiting resistor 564, a filter capacitor 566, ½th of the darlington array 546b, a pull-up resistor 568, a capacitor 570, the resistor 552, the diode 554, to the pin 556 of the microcontroller 558 and a port pin 572 of the microcontroller 558. A large switch 573 is input through a half-wave rectifier 574, a current limiting resistor 576, a filter capacitor 578, ½th of the darlington array 546c, a pull-up resistor 580, a capacitor 582, the resistor 552, the diode 554, to the pin 556 of the microcontroller 558 and a port pin 583 of the microcontroller 558.

A small lamp circuit includes a port pin 584 of the microcontroller 558, a base resistor 586, a transistor 588 and a half-wave rectifier 590 connected to a small indicator lamp 592 of the brewer. A medium lamp circuit includes a port pin 594 of the microcontroller 558, a base resistor 596, a transistor 598 and a half-wave rectifier 600 connected to a medium indicator lamp 602 of the brewer. A large lamp circuit includes a port pin 604 of the microcontroller 558, a base resistor 606, a transistor 608 and a half-wave rectifier 610 connected to a large indictor lamp 612.

A first water solenoid output includes a port pin 640 of the microcontroller 558, ½th of the darlington array 546d, a base pull-up resistor 616, a diode 618, a transistor 620, a relay winding 622, a filter capacitor 624 connected across the relay, current limiting resistors 626 (for a 240 v model) and 628, a half-wave rectifier 630 and a half-wave rectifiers 632 (from the small switch 539), 634 (from the medium switch 561) and 636 (from the large switch 573). These elements are connected to control a water solenoid 638 that operates the water control valve of the brewer.

A second water solenoid output includes a port pin 614 of the microcontroller 558, 1/7th of the darlington array 546e, a base pull-up resistor 642, a diode 644, a transistor 646, a relay 648, a filter capacitor 650, current limiting resistors 652 (for a 240 V model) and 654, the half-wave rectifier 630 and the half-wave rectifiers 632 (from the small switch input), 634 (from the medium switch input) and 636 (from the large switch input).

A PROG/RUN mode switch circuit includes a mode switch 656, a pull-up resistor 658 and port pin 660 of the microcontroller 558. A power-up reset circuit includes a low voltage detector 662, a pull-up resistor 664, a capacitor 666 and a reset pin 667 of the microcontroller 558. A microcontroller oscillator circuit includes a ceramic resonator 668, a resistor 670, a pin 672 of the microcontroller 558 and a additional pin 674 of the microcontroller 558.

A communication receive circuit includes an opto-coupler 676, a pull-up resistor 678 and a port pin 680 of the microcontroller 0558. A communication transmit circuit includes a port pin 682 of the microcontroller 558, 1/7th of the darlington array 546f, a diode 684, an opto-coupler 687, a resistor 688, a filter capacitor 670, a current limiting resistor 672, a resistor 674, a resistor 676 and a transistor 678.

A non-volatile memory circuit includes a port pin 681 of the microcontroller 558, a pull-up resistor 682, a non-volatile memory 684 and a port pin 686 of the microcontroller 558. A capacitor 689 is a high frequency bypass capacitor for the microcontroller 558.

Circuit operation:

At power-up, the positive alternation of L1 with respect to L2 is rectified by the half-wave rectifier 520. The current is limited by the resistors 522 (for 240 v unit) and 524. The voltage is filtered by the capacitor 526 and becomes the source voltage for the voltage regulator 534. The zener diode 532 clamps the voltage to a safe level for the input of the voltage regulator 534 should the line voltage get too high. The output of the voltage regulator 534 is regulated to +5 v for the circuitry.

The reset circuit holds the microcontroller reuntil the 667 low until the +5 v supply is approximately 4.69 v, at which time the output of the reset circuit 662 becomes an open circuit and the reset pin 667 of the microcontroller 558 is pulled to +5 v through the resistor 664. At this time, the microcontroller 558 begins to run. The microcontroller 558 then initialize all port pins. Port pins 614 and 640 are set as outputs and are high after power-up, turning off the relay drive circuitry. The port pins 604, 594 and 584 are set as outputs and are low after power-up, turning off the lamp outputs. The port pin 682 is set as an output and is low after power-up, closing the current loop. The port pin 680 is a bi-directional port pin. It is an output when sending data to the non-volatile memory 684. Alternately, it is set as an input when reading the non-volatile memory.

The port pin 686 is set as an output. It is used when the pin 680 is an output to set-up a read or write sequence for the non-volatile memory 684 and to clock data in or out after the read or write sequence has been initiated. The port pins 560, 572 and 583 are set as inputs. They are high when a selector switch is not pressed and low when a selector switch is pressed. The port pin 660 is set as an input and is high when the PROG/RUN mode switch 656 is in the PROG position and low when the PROG/RUN switch is in the RUN position. The port pin 681 is set as an input and is high when the current loop is open and low when the current loop is closed. The port pin 692 is set as an input and is pulled high through a resistor 690. This port pin 692 is not being used.

When the PROG/RUN switch 656 is in the RUN position, the microcontroller 558 watches the port pin 680 of the microcontroller 558 to see if the current loop is open for more than one second. If the current loop has been open for more than one second, the control operates as a stand-alone unit. If the current loop has not been open for more than one second, the control operates in the interlock mode.

Figure 13:
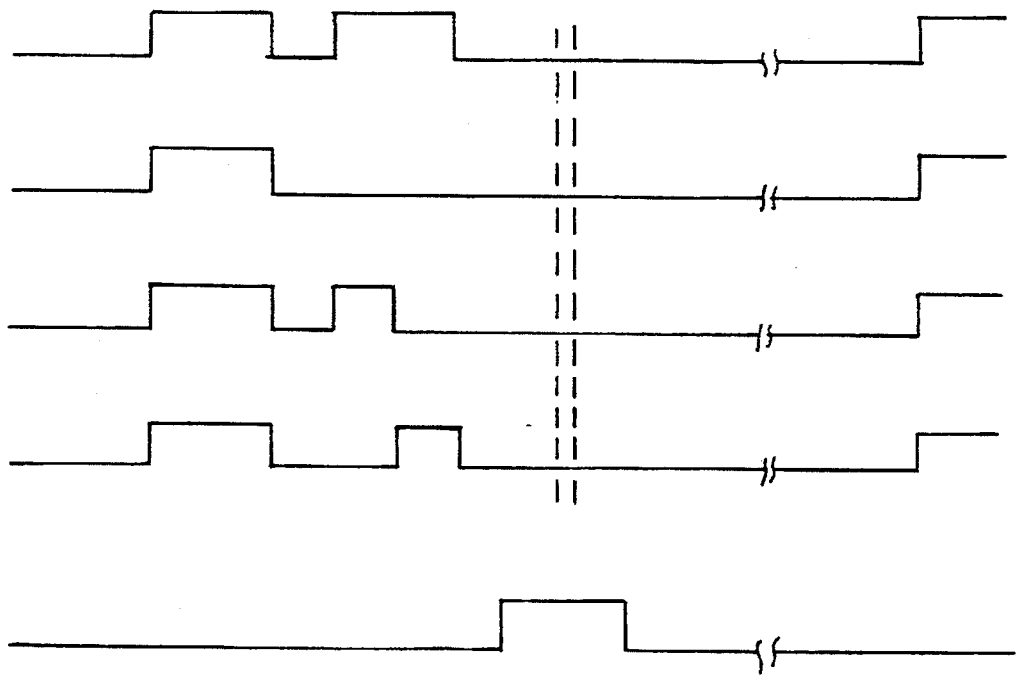
FIG. 13 is a timing diagram showing the signals carried on the communication link of the present invention.

In the interlock mode, the microcontroller looks at the port pin 680 for the sync pulse from the grinder, followed by the size signal (refer to FIG. 13 for the serial communications protocol for the grinder). If the size signal is a "no beans pending" signal, a brew cycle is not allowed. If the size signal is small size pending, the microcontroller will turn on the small lamp. The port pin 584 of the microcontroller 558 will go high, providing base current for the transistor 588 through the resistor 586. The transistor 588 turns on. The positive alternation of L1 with respect to L2 is rectified by the half-wave rectifier 590 and the small lamp will light. At this time, the microcontroller 558 looks at the port pin 680 to read the current loop. If the size signal is equal to the "no size pending" signal, or the current loop has been open for more than one second, the port pin 584 of the microcontroller 558 will go low removing the base current to transistor 588 turning off the lamp. If the size signal is still equal to the "small size pending" signal, the port pin 584 will remain high (the lamp on). The microcontroller watches the port pin 560 for the allowed cycle to be initiated. All other selector switch inputs are locked-out. When the small selector switch is pressed, the positive alternation of L1 with respect to L2 will be rectified by the half-wave rectifier 632, becoming the source voltage for the relay 622. The positive alternation of L1 is rectified by the half-wave rectifier 540. The current is limited by the resistor 542 and filtered by the capacitor 544 becoming the source voltage for the darlington transistor (represented by an invertor symbol). The darlington transistor then turns on, pulling the port pin 560 of the microcontroller 558 low. A low going pulse is sent to the 556 line of the microcontroller 558. This pulse is used to "wake-up" the microcontroller should the program lock-up due to electrical noise. When the microcontroller senses the pin 560 is low, the current loop is read again. Following the next size signal, the acknowledgement signal is sent (as will be described later in conjunction with FIG. 13). The port pin 682 goes high turning on the darlington transistor. The anode of the opto-coupler 686 is pulled to circuit ground, turning off the LED of the opto-coupler 686. The output transistor of the opto-coupler 686 turns off the base current to the transistor 678. The transistor 678 turns off and opens the current loop, thus, sending the acknowledgement pulse. When the acknowledgement is finished, the port pin 682 of the microcontroller 558 goes low turning off the darlington transistor. The output of the darlington transistor becomes open circuit and the opto-coupler LED turns on through resistor 688. The output transistor of opto-coupler 686 turns on, allowing base current to flow to the transistor 678. The transistor 678 turns on and the current loop is now closed. After the acknowledgement is sent, the microcontroller reads the timer value from the non-volatile memory 684. The serial data is read in on the port pin 681 (input) of the microcontroller 558 and clocked by the port pin 686 (output) of the microcontroller 558. At this time, the microcontroller turns on the water output. The port pin 640 of the microcontroller 558 goes low, turning off the-darlington transistor. The output of the darlington transistor becomes an open circuit, allowing base current for the transistor 620 to flow through the resistor 616. The transistor 620 turns on, energizing relay 622. The capacitor 624 filters the voltage across the relay 622. The current to the relay 622 is limited by the resistors 626 (for 240 v units) and 628. When the contacts of the relay 622 transfer, the line voltage is now latched and rectified through the half-wave rectifier 630. During the brew cycle, the small lamp output will flash by the port pin 584 going high and low. After the brew time has elapsed, the port pin 640 of the microcontroller 558 goes high. The darlington transistor turns on. The output of the darlington transistor goes low, removing the base current from the transistor 620. The collector of transistor 620 becomes an open circuit and the relay 622 de-energizes. The port pin 584 continues going high and low flashing the lamp output for an additional 90 seconds. After 90 seconds, the port pin 584 goes low removing base current from the transistor 588. The collector of transistor 588 open circuits and the lamp turns off. During the 90 second flash time, any new brew cycles are not allowed.

A medium and large brew cycle will operate in the same manner using their respective switch inputs and lamp outputs with one exception. The large brew cycle turns on the water output and the bypass output.

In the stand-alone operation, a new brew cycle can be started any time after the current cycle has finished. When the port pin 660 is high (as a result of the PROG/RUN mode switch being open), the microcontroller initiates the program mode. The port pins 604, 594 and 584 go high and low flashing all three lamp outputs. A momentary start switch closure turns on the outputs and only the lamp output for the selection being programmed will flash. A small program cycle turns on the water output only. A medium program cycle turns on the water output only. A large program cycle turns on the water output and the bypass output. The microcontroller starts a counter. When the desired program time is reached, a momentary closure of the start switch terminates the program cycle and the outputs turn off and the microcontroller stops the counter. All lamp outputs will now flash. If other selections require programing, repeat the process.

When all selections have been programmed, the PROG/RUN mode switch is placed in the RUN position (the switch is closed). The port pin 660 is pulled low. The microcontroller then saves the counter values in the non-volatile memory 684. The data is sent by the port pin 681 of the microcontroller 558 and clocked into the non-volatile memory by the port pin 686 of the microcontroller 558. The port pins 604, 594 and 584 go low, turning off the lamp outputs. The microcontroller now returns to run mode.

Signal Diagram

The signals appearing on the communication link for the present circuit are shown in FIG. 13. The overall communication protocol for information exchange between the grinder and brewer provides that the grinder control transmits a synchronization pulse on the communication link, followed by a pulse that indicates the quantity of coffee beans which have been ground, or indicates that there have been no beans ground. At a predetermined time after the synchronization pulse, the grinder control checks the communication link for an acknowledgement from the brewer control that the corresponding brew cycle has been initiated.

In detail, as shown in FIG. 13, the first signal shown is the "no beans pending" signal, which has a synchronization pulse in the first pulse frame followed by a long pulse in the second pulse frame. Following the second pulse frame, the broken line indicates the frame that is checked for the acknowledgement from the brewer. At some time after the acknowledgement frame, the same signal sequence is repeated until the acknowledgement is received.

In the second signal of FIG. 13, the synchronization is followed by no pulse in the second frame, in other words, the level remains at "0" during the time that the brewer is checking for a size signal. This indicates that a small size grind has been selected in the grinder. The low or "0" signal level indicates that the current loop of the communication link is closed, while a high or "1" indicates that the loop is open.

The third signal indicates a medium size grind by the grinder. Following the synchronization pulse, the second pulse frame has a high or "1" signal which then goes low or to "0" for the second half of the second signal frame. The fourth signal, accordingly, indicates a large size grind cycle by the grinder, wherein the second pulse frame is initially low and goes high or to "1" at the mid point of the second frame.

The last signal shown is the signal emitted by the brewer after the corresponding brew cycle has been selected. The brewer control transmits an acknowledgement pulse, as shown, on the communication link at the time indicated by the broken lines, which is the acknowledgement frame.

In an exemplary embodiment, the synchronization pulse and the second pulse frame are each 82 ms in length with 41 ms between them. The acknowledgement frame is approximately 280 ms from the start of the synchronization pulse and extends for 8.2 ms. Of course, other signal protocols can be used to convey the necessary information.

Alternate uses

The present control may be used to connect the controls of any two or more related units, for example, an ice crusher/dispenser and a cold drink dispenser which are controlled so that the proper quantity of ice is crushed and/or dispensed for the capacity of cold drink to be dispensed. Coffee grinders may be linked to espresso machines for espresso, milk dispensers/steamers may be linked to espresso machines for cappaccino, batter mix dispensers may be linked to controlled quantity water dispensers, etc. with controls according to the present invention. Many other uses interconnecting two related devices are possible as well.

Although other modifications and changes may be suggested by those skilled in the art, it is the intention of the inventors to embody within the patent warranted hereon all changes and modifications as reasonably and properly come within the scope of their contribution to the art.

We claim:

1. A method for calibrating a coffee brewer for automatic operation, comprising the steps of:

determining whether a control circuit for the coffee brewer is in a calibrate mode or a normal run mode;

setting said control circuit to said calibrate mode if said determining step determines that said control circuit is in said normal run mode;

initiating a brewing operation of the coffee brewer for a predetermined quantity of water;

timing a running of said brewing operation;

halting said brewing operation when said predetermined quantity of water is output from the coffee brewer during said brewing operation and simultaneously halting said timing to define a time from said initiating step, said time being a calibrated brew time; and setting said control circuit to said normal run mode which automatically operates said coffee brewer for said calibrated brew time.

2. A method as claimed in claim 1, wherein water pressure of a water supply to which the coffee brewer is connected varies; and wherein a length of said calibrated brew time as timed by said timing step depends on said water pressure.

3. A method as claimed in claim 1, wherein said step of initiating includes opening a water valve in the coffee brewer; and wherein said step of halting includes closing said water valve.

4. A method as claimed in claim 1, further comprising the step of:

connecting the coffee brewer to a municipal water supply before said step of initiating a brewing operation.

5. A method as claimed in claim 1, wherein said step of initiating a brewing operation initiates a first brewing operation for a first predetermined quantity of water and said calibrated brew time is a first calibrated brew time, and further comprising the steps of:

initiating a second brewing operation of the coffee brewer for a second predetermined quantity of water;

timing a running of said second brewing operation;

halting said second brewing operation when said second predetermined quantity of water is output from the coffee brewer during said second brewing operation and simultaneously halting said timing to define a second time from said initiating step, said time being a second calibrated brew time.

6. A method as claimed in claim 5, wherein said steps of initiating, timing and halting for said second brewing operation are repeated for a third brewing operation for a third predetermined quantity of water.

7. A method as claimed in claim 1, further comprising the step of: storing said calibrated brew time in a memory.

8. A method as claimed in claim 7, wherein said storing step stores said calibrated brew time in a first memory while said control circuit is in said calibrate mode, and further comprising the steps of:

providing a second memory for storing a calibrated brew time during said normal run mode;

comparing contents of said first memory to contents of said second memory upon said setting step; and writing said calibrated brew time from said first memory to said second memory if said comparing step finds a difference in the calibrated brew times.

9. A method for calibrating a coffee brewer for automatic operation, comprising the steps of:

setting a control for the coffee brewer to a calibrate mode;

initiating a brewing operation of the coffee brewer;

halting said brewing operation when a predetermined quantity of water is output from the coffee brewer during said brewing operation so as to define a brew operation time from said initiating step; and setting said control to a normal run mode which automatically operates said coffee brewer for said brew operation time, wherein said step of setting includes storing said brew operation time in a memory, and wherein said coffee brewer operates during said normal run mode for a duration of said brew operation time as stored in said memory.

10. A method for calibrating a coffee brewer for automatic operation, comprising the steps of:

initiating a brewing operation of the coffee brewer;

halting said brewing operation when a predetermined quantity of water is output from the coffee brewer during said brewing operation so as to define a brew operation time from said initiating step; and Setting said control to a normal run mode which automatically operates said coffee brewer for said brew operation time, wherein a brew time for said normal run mode is stored in a brew memory, and further comprising the step of:

storing said brew operation time obtained in said calibration mode in a calibration memory;

comparing contents of said brew memory to contents of said calibration memory; and writing said brew operation time obtained in said calibration mode to said brew memory if contents of said brew memory differ from contents of said calibration memory.

* * * * *